United States Patent

Finke

[15] 3,695,133
[45] Oct. 3, 1972

[54] APPARATUS FOR CUTTING STRIP MATERIAL IN VARIABLE LENGTHS

[72] Inventor: Theodore R. Finke, Euclid, Ohio

[73] Assignee: The Euclid Products Co., Inc., Willoughby, Ohio

[22] Filed: July 16, 1970

[21] Appl. No.: 55,401

[52] U.S. Cl. .................83/204, 83/222, 83/241, 83/283
[51] Int. Cl. .................................B26d 5/24
[58] Field of Search.........83/204, 241, 247, 283, 222

[56] References Cited

UNITED STATES PATENTS

| | | |
|---|---|---|
| 2,748,861 | 6/1956 | Von Stoeser ............83/241 X |
| 3,176,563 | 4/1965 | Sharpe..........................83/241 |
| 3,465,629 | 9/1969 | Krueger..................83/241 X |
| 3,293,967 | 12/1966 | Sharpe..........................83/241 |
| 3,165,959 | 1/1965 | Eidson....................83/241 X |
| 2,355,796 | 8/1944 | Gollwitzer...............83/283 X |
| 2,458,612 | 1/1949 | Luzzatto..................83/283 X |

*Primary Examiner*—James M. Meister
*Attorney*—Bosworth, Sessions, Herrstrom & Cain

[57] ABSTRACT

Apparatus for cutting strand material, such as fabric strip material into finite segments of a preselected length. An end length of strip material is fed past a cutting mechanism until a desired length has been advanced. Then the feeding is stopped by an adjustable, length control mechanism operatively connected to the feeding mechanism and the cutting mechanism is actuated to cut the delivered segment from the strip. The apparatus will either repeat this function automatically or in response to actuation by an operator.

6 Claims, 5 Drawing Figures

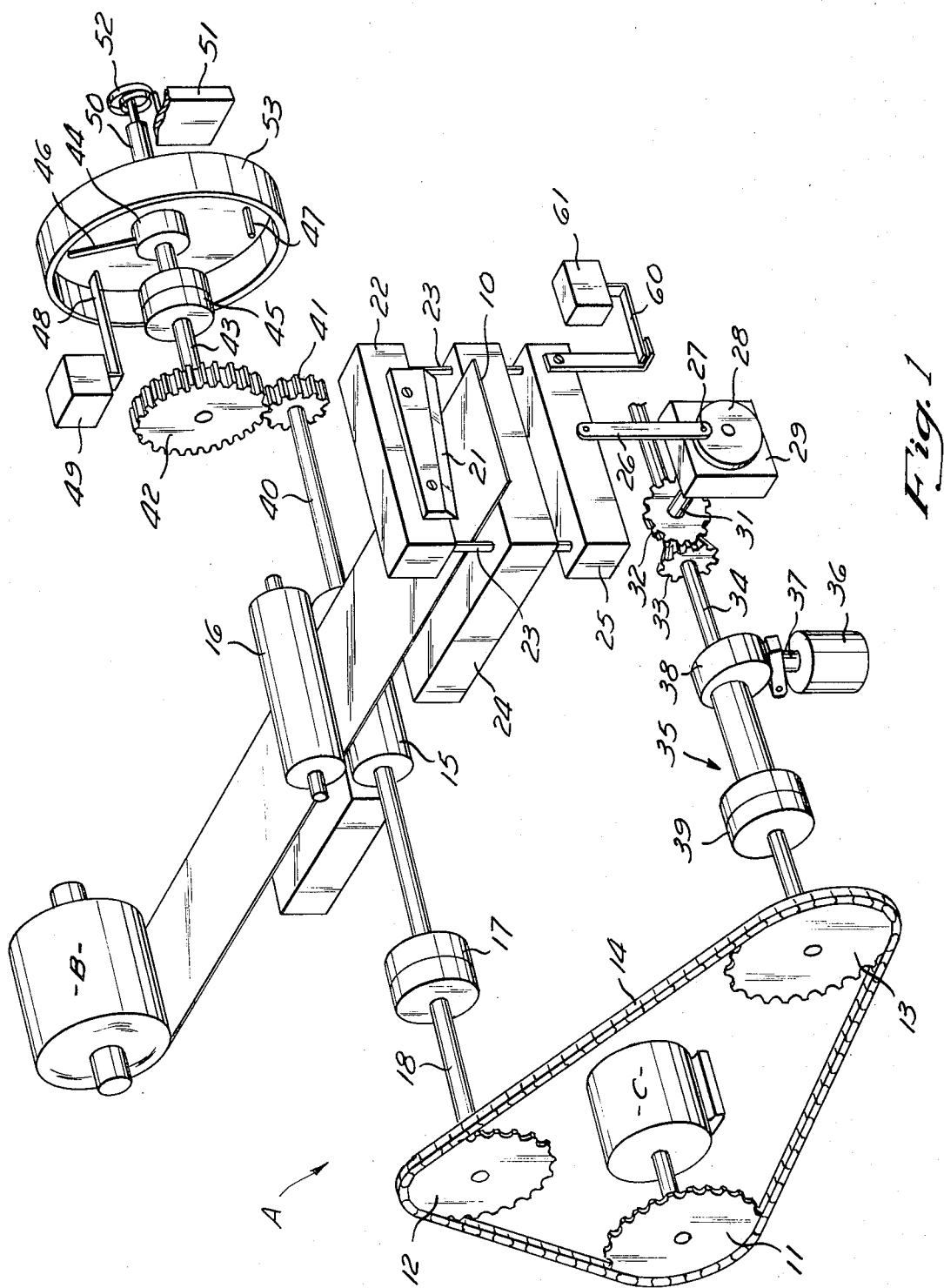

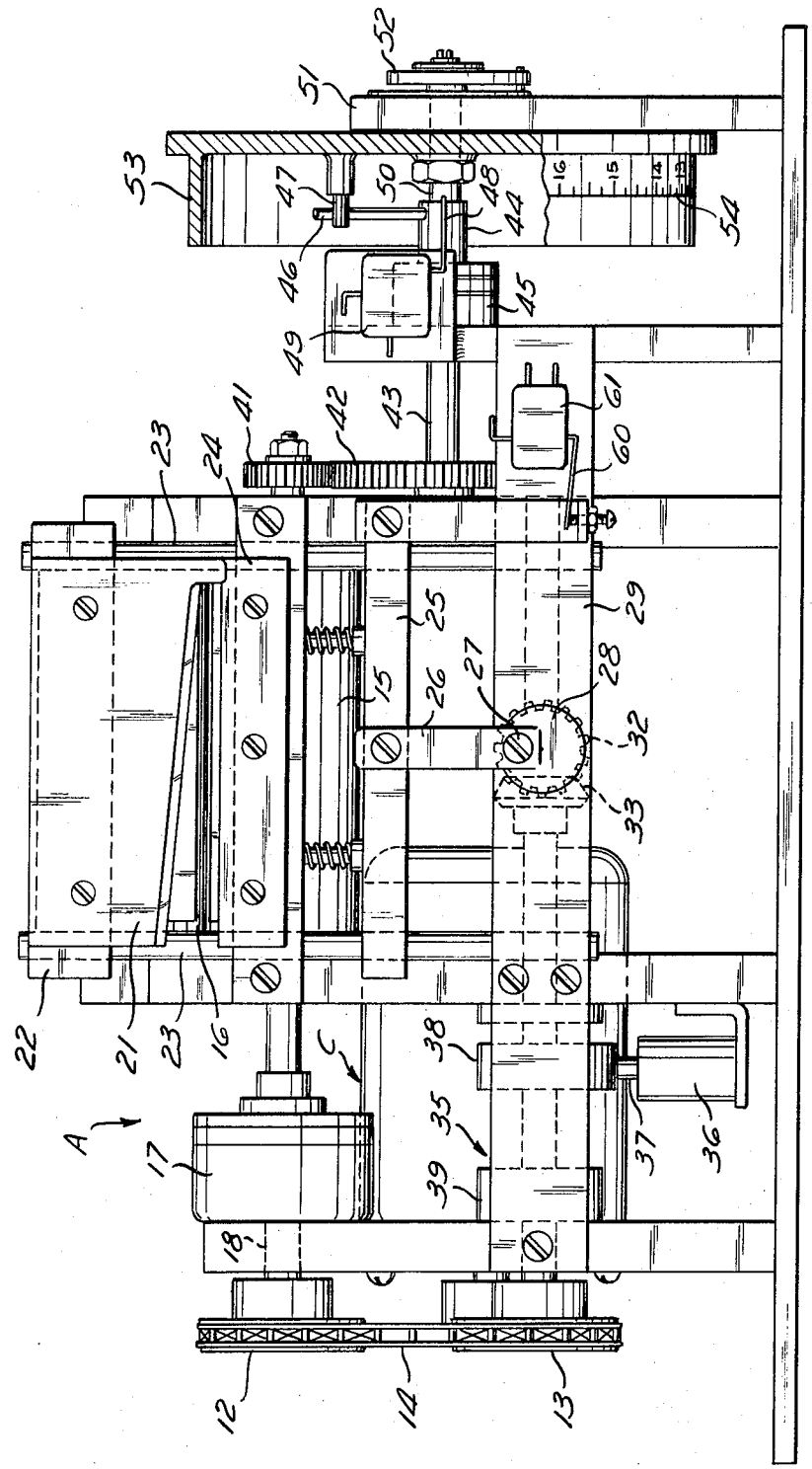

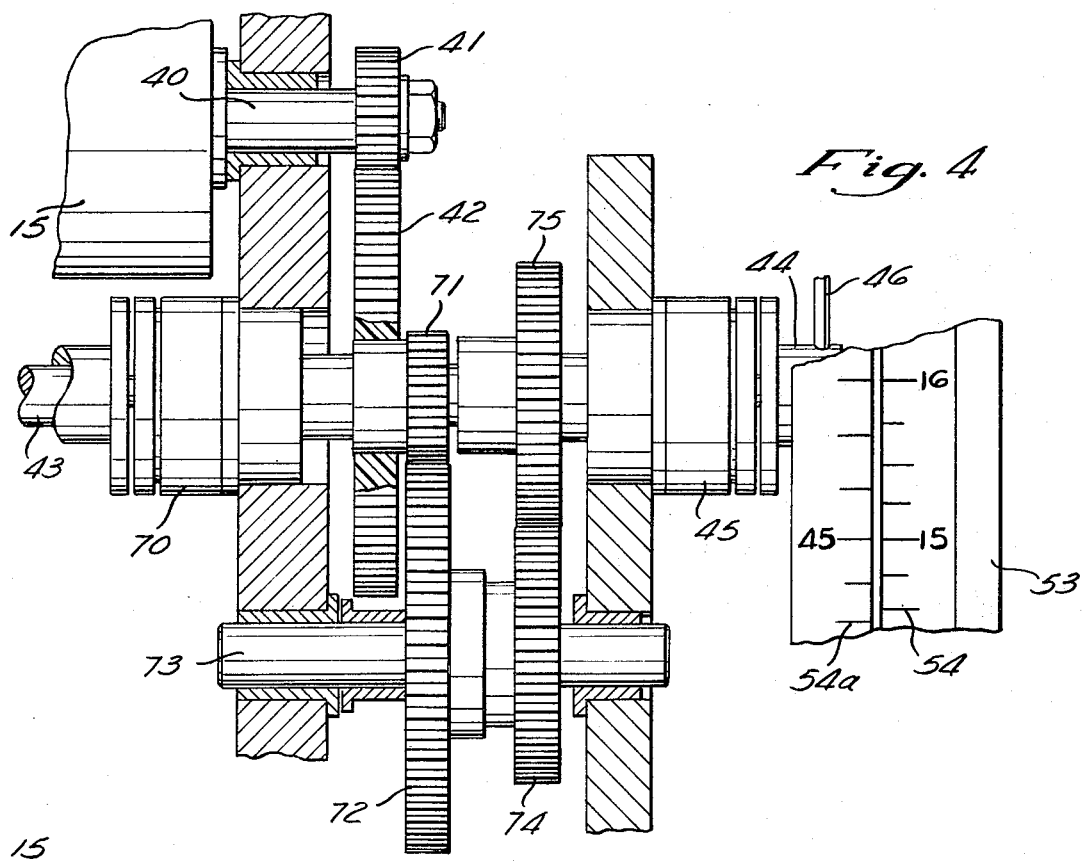
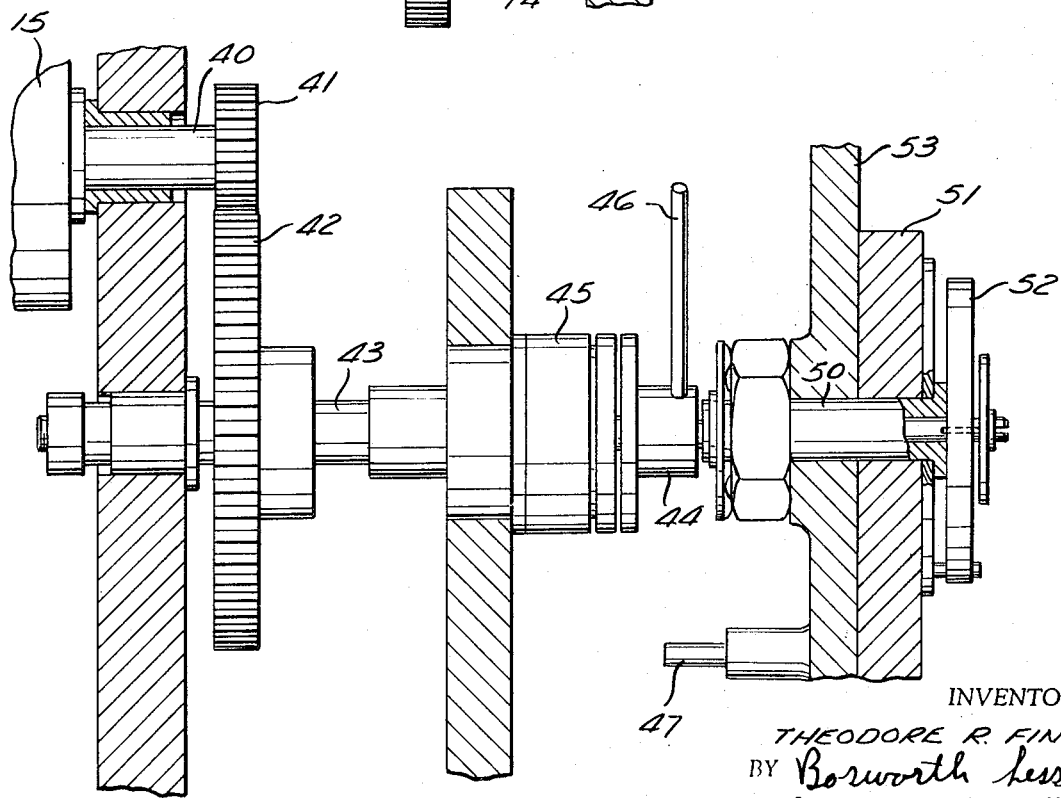

3,695,133

APPARATUS FOR CUTTING STRIP MATERIAL IN VARIABLE LENGTHS

BACKGROUND OF THE INVENTION

This invention relates to the cutting of segments of strand materials from an end length that is fed for example from a supply reel, and especially to an apparatus for automatically stopping the feeding of the strand material after a preselected end length has been delivered, and cutting the delivered length from the strand material. More particularly the invention relates to a strand cutting apparatus including a mechanism for varying the amount of strand material that is delivered for cutting before each cut is made so that the length of the segment or segments to be cut can be accurately preselected by an operator.

While the invention may be applicable to apparatus for cutting various kinds of strand material, it has particular utility in connection with the cutting of fabric strip material such as for example fabric reinforcing tape used in the manufacture of various textile products such as clothing. Therefore, it will be discussed hereafter in connection with such use. Such reinforcing tape is often provided with a dry adhesive coating that melts and bonds upon application of heat.

Under production conditions a worker has need for a large number of segments of strip material of the same length on a continuing basis and cutting the required number by hand in advance would be too inefficient and time-consuming. While some devices are available for cutting such strip material automatically, they lack the desired versatility in that adjustment of the device to vary the length of the segments to be cut is difficult and usually requires special skill.

Also some production circumstances are better suited to the use of an automatic cutting device that continuously feeds and cuts segments of strip material on a repeating basis so that a large number of such segments can be cut without monitoring by an operator.

The apparatus of the present invention satisfies a long-felt need for such equipment and affords other features and advantages heretofore not obtainable.

SUMMARY OF THE INVENTION

It is among the objects of the invention to cut segments of strand or strip material into preselected lengths automatically, either in response to actuation by an operator as to each such segment or continuously on an automatically repeating basis.

Another object is to provide a means for quickly and accurately preselecting or varying the length of a segment of strand or strip material to be cut from a supply strand or strip being delivered to a cutting device.

These and other objects are accomplished by means of an apparatus comprising a feed means for advancing an end length of strand or strip material from a supply reel for example and means for cutting a segment of preselected length from the end length that has been advanced by the feed means. The feed means is stopped after a preselected length of material has been advanced and the cutting means is actuated after the feed means has been stopped, by a length control mechanism operatively connected to the feed means. The length control mechanism includes a rotary operating member that swings through an adjustable arc between a preselected limit position and a switch actuating position. When the member has been swung through the selected arc from its limit position to the switch actuating position it is automatically released or disengaged from the feed means and a spring means returns it to its limit position. The limit position may be selectively changed by an operator to vary the arc through which the arm must swing before reaching its switch actuating position, and thereby to vary the length of material that is advanced before the cutting is accomplished.

According to the preferred form of the invention, the starting and stopping of the feed means and the engagement and disengagement of the operating member from the feed means is accomplished by magnetic clutches that are energized or deenergized as required by electrical means responsive to the switching accomplished when the operating member reaches its switch actuating position.

BRIEF DESCRIPTION OF THE DRAWINGS

FIG. 1 is a schematic diagram illustrating the function and inter-relation of the various mechanical components of an apparatus embodying the invention;

FIG. 2 is a front elevation of an apparatus embodying the invention shown schematically in FIG. 1, with parts broken away and shown in section;

FIG. 3 is a fragmentary sectional view on an enlarged scale illustrating the length control mechanism of the apparatus of FIG. 2;

FIG. 4 is a fragmentary sectional view on an enlarged scale illustrating a modified form of length control mechanism adapted for use on an apparatus of the type illustrated in FIG. 3 and which provides for two different ranges of length selection.

DESCRIPTION OF THE PREFERRED EMBODIMENTS

Figure 5:
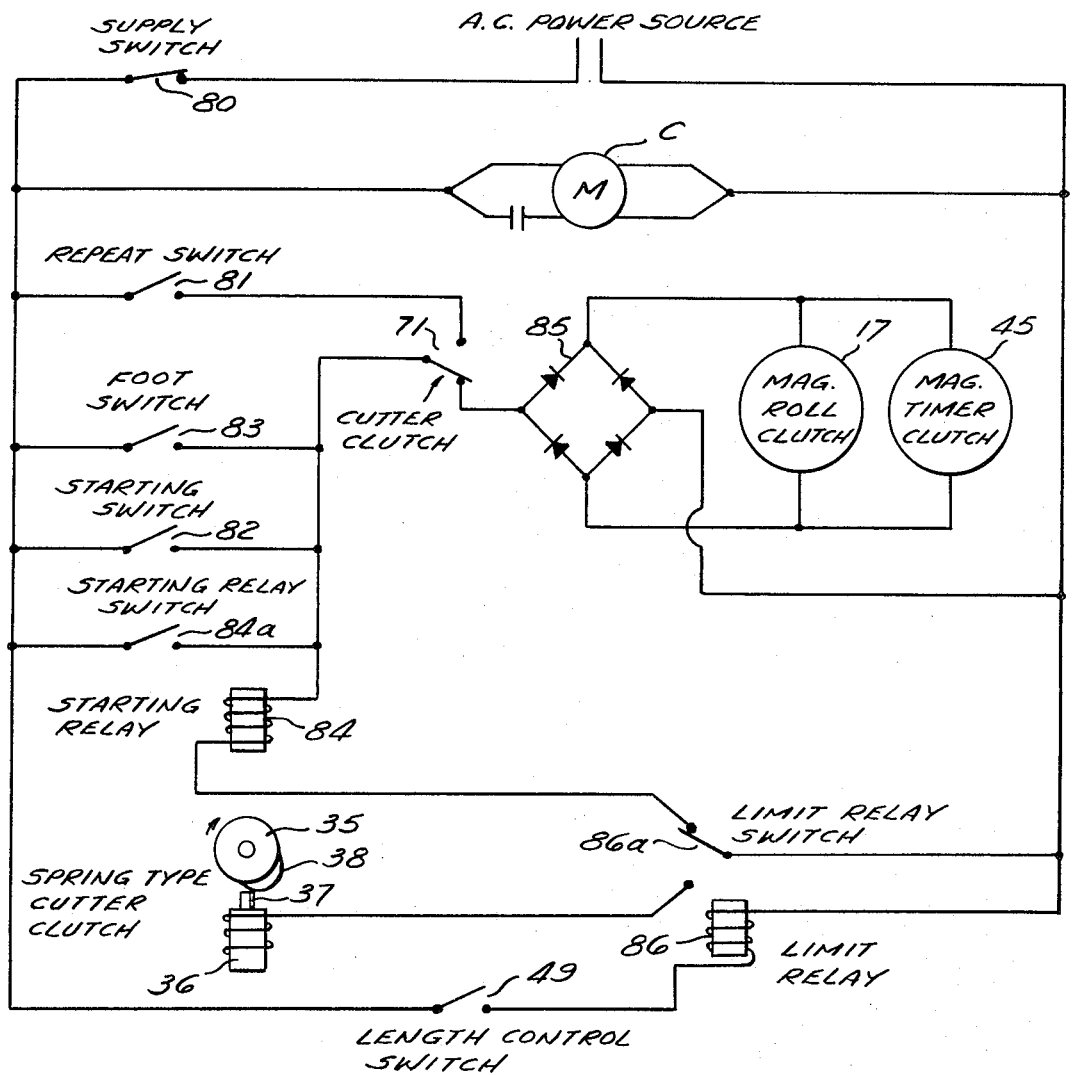
FIG. 5 is a schematic diagram of the electrical control system for the apparatus illustrated in FIG. 1.

Referring more particularly to the drawings and initially to FIGS. 1 and 2 there is shown an apparatus A for cutting segments of preselected length from an end length 10 of strip material fed from a supply reel B. The apparatus A has a drive motor C with a drive sprocket 11 that turns a roll drive sprocket 12 and a cutter drive sprocket 13 by a chain 14. Sprocket 12 drives a feed roll 15 that cooperates with another feed roll 16 to advance the end length 10 of strip material from the supply reel B. The rolls 15 and 16 tightly grip the strip material therebetween. A magnetic clutch 17 is operatively positioned between the feed roll 15 and the drive shaft 18 from the sprocket 12 so that the feed rolls 15 and 16 can be stopped by disengaging the clutch 17.

The cutter drive sprocket 13 drives a cutting mechanism that includes a movable shearing blade 21 fastened to a blade carrier block 22 mounted on vertical rods 23 that extend through a stationary supporting plate 24 that supports the advanced end length 10 of material during feeding and cutting. The forward edge of plate 24 is shaped to act as a stationary shearing blade that cooperates with movable blade 21 to shear the strip material. Connected to the lower ends of the control rods 23 and 24 is a lower block 25 with one end of a connecting rod 26 pivotally connected thereto to drive the blocks 22 and 25 and the shearing blade 21 through a reciprocating cutting cycle. The other end of the connecting rod 26 is connected to the crank arm 27 of a crank 28 mounted in a bearing block 29. Accordingly one rotation of the crank 28 from the position shown in FIG. 1 causes one reciprocating cutting cycle wherein the blade 21 is carried down by the blocks 22 and 25 closely adjacent the forward edge of the supporting plate 24 to shear the end length of strip material extending beyond the supporting plate 24.

The crank 28 is driven by a shaft 31 with a bevel gear 32 on one end that meshes with another bevel gear 33 mounted on a shaft 34. The shaft 34 is operatively connected to the cutter drive sprocket 13 through an electrically actuated single revolution spring clutch 35. This type of clutch is well known in the art and commercially available from Precision Specialties, Inc. and other sources under the trade designation of solenoid-actuated wrap-spring clutch. The spring clutch 35 includes a solenoid 36 with a plunger 37 that engages a rotary cam 38 after one revolution of the shaft 34 is completed. When the cam 38 is stopped by the plunger extending from the solenoid additional rotation releases a spring mechanism to disengage the clutching portion 39.

LENGTH CONTROL MECHANISM

The feed roll 15 has a shaft 40 extending therefrom on the side opposite that of the feed roll drive sprocket 12. The shaft 40 has a pinion 41 that turns a reducer gear 42 mounted on a shaft 43. The shaft 43 drives a switch actuator carrier 44 through a magnetic clutch 45. The carrier 44 carries a switch actuator rod 46 that swings through an arc from a movable stop pin 47 to a switch arm 48 connected to a length control switch 49. The shaft 50 on which the switch actuator carrier 44 is mounted, extends to a bearing block 51 and the switch actuator rod 46 is biased to a limit position in engagement with the stop pin 47 (FIG. 1) by a coil spring 52 connected between the bearing block 51 and the shaft 50.

The stop pin 47 is carried on a rotatable drum 53 that preferably has a length-indicating scale 54 marked thereon. Turning of the drum 53 changes the position of the stop pin 47 relative to switch actuator rod 46 to vary the length of the arc through which the rod 46 swings from its stop pin engaging limit position (FIG. 1) to its switch actuating position. In this way the arc can be shortened or lengthened to shorten or lengthen the amount of strip material advanced by the feed roll 16 during the travel of the switch actuator rod 46 through its arc. When the rod 46 engages the switch arm 48 actuating the switch 49, the magnetic clutch 45 disengages and the coil spring 52 returns the rod 46 to its limit position in engagement with the stop pin 47. At the same time that the magnetic clutch 45 is de-energized and disengaged, the clutch 17 is also de-energized and disengaged to stop the turning of the feed rolls 15 and 16 and the solenoid 30 of the electrically actuated single revolution spring clutch 35 is actuated to withdraw the plunger 37 from the cam 38 and permit engagement of the clutch 35 to drive the cutting mechanism. After the cutting mechanism has completed a cutting cycle the lower block 25 engages and lifts a switch arm 70 of a cutter switch 71. At this time the magnetic clutches 17 and 45 are again energized and engaged to start a repeat of the feed cycle as will be discussed in more detail in connection with the control circuit illustrated in FIG. 5.

FIG. 4 shows a modified form of the length control mechanism wherein two different ranges of length selection are provided for the rotary adjustment range of the drum 53. This modification includes two gear reduction trains the first of which provides the same gear reduction as afforded in the mechanism of FIG. 3 while the second selection provides a second range with greater gear reduction so that a much longer length of material can be selected within the range of adjustment of the stop pin 47.

The reducer gear 42 is connected to the shaft 43 through a magnetic clutch 70 so that when the clutch 70 is engaged the gear 42 turns the shaft 43, the switch actuator carrier 44, and the switch actuator rod 46. Thus when the clutch 70 is engaged, the gear reduction is the same as in the length control mechanism of FIGS. 1, 2 and 3.

When the clutch 70 is disengaged, however, the gear 42 does not directly drive the shafts 43, and the drive moves instead from the gear 42 through a pinion gear 71 that meshes with a reducer gear 72 mounted on a shaft 73. The shaft 73 also carries another smaller gear 74 that meshes with a gear 75 mounted on the shaft. Thus the drive to the shaft 44 moves through gears 42, 71, 72, 74 and 75 respectively to provide a much greater gear reduction than is provided for the selection range of the length control mechanism of FIGS. 1, 2 and 3. The range selection is made by either energizing the magnetic clutch 70 for the short range, or magnetic clutch 45 for the long range.

With such modification, it is desirable that the drum 53 carry not only length indicating indicia 54, but also length indicating indicia 54a; preferably, the lengths indicated on scale 54a are multiples of those shown on scale 54 that are based on the ratios of gears 41, 42, 71, 72, 74 and 75.

CONTROL CIRCUIT

FIG. 5 illustrates a typical electrical control circuit for the apparatus of FIGS. 1 to 3 and it will be described sequentially according to the mode of operation of the apparatus. The control system is energized by an on-off type supply switch 80 that starts the motor C. A repeat switch 81 is used to select the mode of operation of the apparatus as between an automatically repeating function or a one cycle function that will be repeated only upon actuation by an operator. The length of the segment of strip material to be cut is determined at the outset by selecting the desired length on the scale on the drum 53 and turning the drum to the correct rotary position.

Initially, the cutter switch 71 is held in the position shown in FIG. 5 by the lower block 25, and the length control switch 49 is open. The cycle is started either by pressing the starter switch 82 or a remote foot switch 83 also in the starting circuit. This completes the circuit to a starting relay 84 which when energized closes starting relay switch 84a to maintain the starting circuit in an energized condition. At the same time that the starting relay 84 is energized, the circuit to the magnetic roll clutch 17 and the magnetic timer clutch 45 is completed through a rectifier 85, the circuit to the rectifier 85 being completed through the terminals of the cutter switch 71 which, as indicated above, has its switch arm 70 in the position shown in FIG. 5.

With the control system in this condition, the feed rolls 15 and 16 will continue to advance an end length 10 of strip material from the supply reel B until the switch actuator rod 46 is carried by the switch actuator rod carrier 44 through a preselected arc from engagement with the stop pin 47 into engagement with the switch arm 48 of the length control switch 49.

When the switch actuator rod 46 engages the switch arm 48, the length control switch 49 is closed to energize limit relay 86. Limit relay 86 moves limit relay switch 86a from its normal position completing the circuit through the starting relay 84, to a second position completing the circuit through the solenoid 36 of the electrically actuated single revolution spring type clutch 35. The solenoid 36 retracts the plunger 37 to release the cam 38 and cause engagement of the cutter clutch 35 while at the same time the starting relay 84 is de-energized and the starting relay switch 84a moves to its open position to open the circuit through the roll clutch 17 and the timer clutch 45, thus de-energizing the clutches 17 and 45 to stop the feed rolls 15 and 16 and also to release the shaft 50 from the shaft 43 to permit the coil spring 52 to return the switch actuator rod 46 to its initial limit position in engagement with the stop pin 47.

With the clutch 35 thus engaged the crank 28 is turned through the bevel gears 32 and 33 to drive the cutting mechanism through its cutting cycle. The connecting rod 27 pulls the lower block 25 as well as the blade carrier block 22 downward to bring the shearing blade 21 across the edge of the supporting plate 24 to shear off the segment of strip material that has been advanced by the rolls 15 and 16. Upon completion of the cutting, the continued rotation of the crank 28 moves the blocks 23 and 25 back upward.

During the cutting cycle, the arm 48 of the length control switch 49 is released since the actuating rod 46 is returned almost immediately to its initial limit position so that the limit relay 86 is quickly de-energized and the limit relay switch 86a returns to the condition shown in FIG. 5. This also de-energizes the solenoid 36 of the spring type cutter clutch 35 and permits the plunger 37 to move upward so that it will engage the cam 38 after the clutch 35 completes one revolution while in an engaged condition. Also, since the cutter switch 71 is released during the cutting cycle, the circuit to the starting relay 84 is completed through the closed repeat switch 81 to energize the starting relay 84 and close the starting relay switch 84a to hold the starting circuit open.

As soon as the cutting cycle is completed, the spring type cutter clutch 35 is disengaged and at the same time the switch arm 60 of the cutter switch 61 is engaged by the lower block 25 and moved back to the position shown in FIG. 5. This again completes the circuit through the transformer 85 to the magnetic roll clutch 17 and the magnetic timer clutch 45 and thus starts the feeding cycle once again.

It will be noted that if the repeat switch is moved to the open position, the operation will be stopped as soon as the cutter clutch 35 is disengaged because the circuit to the starting relay will not be completed and the starting relay will remain de-energized. The feeding and cutting cycles may, however, be repeated when an operator actuates a foot switch 83 or the starter switch 82.

It will also be noted that the clutches 17 and 45 cannot be engaged during the cutting cycle because the cutter switch 71 keeps the circuit open to the transformer 85 until the cutting cycle is completed and the cutter switch 71 is moved to the position shown in FIG. 5 to complete the circuit to the magnetic clutches 17 and 45 when the switch arm 60 is engaged by the lower block 25.

While the invention has been shown and described with reference to specific embodiments thereof, these are intended for the purpose of illustration rather than limitation, and other variations and modifications will occur to those skilled in the art upon a reading of the specification. Accordingly, the patent is not to be limited to the forms or embodiments of the invention herein specifically illustrated and described nor any manner inconsistent with the extent to which the progress in the art has been advanced by the invention.

I claim:

1. Apparatus for cutting segments of preselected length from a supply of strand material comprising: feed means for advancing an end length of strand material from said supply, comprising cooperating feed rolls that grip said end length, drive means operatively connected to at least one of said rolls, and a clutch between said drive means and said roll adapted when engaged to cause said drive means to rotate said rolls and when disengaged to halt rotation of said rolls; means for cutting a segment of preselected length from said end length of strand material advanced by said feed means; length control means operatively connected to said feed means for stopping said feed means after a preselected length of strand material has been advanced and for actuating said cutting means when said feed means has been stopped, said control means including a movable operating member that moves through an adjustable path between a preselected limit position and a switch actuating position, means disengaging said clutch from said roll of said feed means when said operating member reaches its switch actuating position, and biasing means for returning said operating member to its limit position when disengaged from said feed means; a plurality of motion transmitting trains between said one feed roll and said movable operating member; and means for selecting one of said trains for operation, whereby one of a plurality of different segment lengths of strand may be selected prior to cutting.

2. The apparatus of claim 1 wherein said movable operating member of said length control means is a rotary operating member that swings through an adjustable arc; wherein said motion transmitting trains comprising two trains of gearing such of which is selectively operatively connected between said drive feed roll and said rotary operating member; and wherein said means for selecting one of said motion transmitting trains includes means for selecting one of said two trains of gearing, whereby one of two different lengths of strand may be selected prior to cutting.

3. Apparatus for cutting a segment of preselected length from a supply of strand material comprising:

feed means for advancing an end length of strand material from said supply comprising rotary means for actuating said feed means, drive means for driving said feed means actuator rotary means, and a first clutch between said rotary means and said drive means; cutting means for cutting a segment of strand material of preselected length from the end length of strand material advanced by said rotary means, comprising rotary cutter operating means and rotary cutter drive means, and a second clutch interposed between said rotary cutter operating means and said rotary cutter drive means; length control means operatively connected to said feed means actuator rotary means for causing said feed means and advancement of said strand material to halt after a preselected length of strand material has been advanced and for causing said cutting means to cut said segment of strand material of preselected length from the remainder of strip material, said length control means including a switch, an operating member that moves through an adjustable path between a preselected limit position and a switch actuating position at which said operating member actuates said switch, biasing means for returning said operating member to its limit position, a third clutch connected between said operating member and said feed means actuator rotary means, and means for adjusting the length of path through which said operating member moves between said limit position and said switch actuating position; and means controlled by said switch when it is actuated by said operating member for releasing said first clutch to halt said feed means actuator rotary means, for engaging said second clutch to rotate said cutter operating means to cause said cutting means to cut said preselected length of strip material from the remainder of the strip material, and for releasing said third clutch to permit said operating member to be moved to its limit position by said biasing means.

4. The apparatus of claim 3 comprising means for disengaging said second clutch after said cutting means makes one cut through said strand material.

5. The apparatus of claim 3 comprising means for repetitively operating said drive means and said clutches so that segments of preselected length of strand material are repetitively cut.

6. The apparatus of claim 3 which comprises two motion transmitting trains between said feed means actuator rotary means and said operating member; and means for selecting one of said trains for operation, whereby a plurality of different segment lengths of strand may be selected prior to cutting.

* * * * *